US008355610B2

(12) United States Patent
Simmonds

(10) Patent No.: US 8,355,610 B2
(45) Date of Patent: Jan. 15, 2013

(54) DISPLAY SYSTEMS

(75) Inventor: Michael David Simmonds, Ashford (GB)

(73) Assignee: Bae Systems PLC, London (GB)

( * ) Notice: Subject to any disclaimer, the term of this patent is extended or adjusted under 35 U.S.C. 154(b) by 282 days.

(21) Appl. No.: 12/305,196

(22) PCT Filed: Oct. 7, 2008

(86) PCT No.: PCT/GB2008/050919
§ 371 (c)(1),
(2), (4) Date: Jul. 28, 2010

(87) PCT Pub. No.: WO2009/050504
PCT Pub. Date: Apr. 23, 2009

(65) Prior Publication Data
US 2010/0284090 A1 Nov. 11, 2010

(30) Foreign Application Priority Data

Oct. 18, 2007 (EP) .................................. 07270061
Oct. 18, 2007 (GB) .................................. 0720386.2

(51) Int. Cl.
*G02B 6/26* (2006.01)
*G09G 5/00* (2006.01)
*G02F 1/1335* (2006.01)

(52) U.S. Cl. .................. 385/37; 385/901; 345/8; 345/9; 349/11; 359/630

(58) Field of Classification Search ....... 345/9; 359/630
See application file for complete search history.

(56) References Cited

U.S. PATENT DOCUMENTS

| 3,798,578 | A | * | 3/1974 | Konishi et al. ................. 333/229 |
| 4,012,123 | A | * | 3/1977 | Fuller ............................ 359/630 |
| 4,852,988 | A | * | 8/1989 | Velez et al. .................... 351/210 |
| 4,912,500 | A | * | 3/1990 | Yokota et al. ................. 396/111 |
| 5,355,224 | A | * | 10/1994 | Wallace ........................ 359/631 |
| 5,459,612 | A | * | 10/1995 | Ingleton ........................ 359/630 |
| 5,608,489 | A | * | 3/1997 | Ozaki ............................ 396/51 |
| 5,629,807 | A | * | 5/1997 | Hall .............................. 359/630 |
| 5,689,736 | A | * | 11/1997 | Okuyama et al. ............... 396/51 |
| 6,191,892 | B1 | * | 2/2001 | Isaka et al. .................... 359/630 |

(Continued)

FOREIGN PATENT DOCUMENTS

EP 0 380 035 8/1990

(Continued)

OTHER PUBLICATIONS

European Patent Office, International Preliminary Report on Patentability, Dec. 21, 2009, from International Patent Application No. PCT/GB2008/050919, filed on Oct. 7, 2008.

(Continued)

*Primary Examiner* — Charlie Peng
(74) *Attorney, Agent, or Firm* — Kenyon and Kenyon LLP

(57) ABSTRACT

A primary waveguide and a coupling waveguide are arranged so a user can view light from a forward scene through the primary waveguide. An image source generates an image which is diffractively coupled into the primary waveguide and internally reflected to an exit area for diffraction towards the user. Light from the forward looking scene is diffracted into the primary waveguide to be internally reflected and coupled to a image intensifier tube assembly. The image intensifier tube assembly enhances light from the forward looking scene and drives the image source such that an image of the enhanced light is overlaid on light from a forward scene at exit area.

16 Claims, 2 Drawing Sheets

U.S. PATENT DOCUMENTS

| | | | |
|---|---|---|---|
| 6,292,158 B1 * | 9/2001 | Amafuji et al. | 345/7 |
| 6,611,385 B2 * | 8/2003 | Song | 359/630 |
| 6,671,100 B1 | 12/2003 | McRuer | |
| 6,791,760 B2 * | 9/2004 | Janeczko et al. | 359/630 |
| 6,914,726 B2 * | 7/2005 | Kasai | 359/629 |
| 6,943,754 B2 * | 9/2005 | Aughey et al. | 345/8 |
| 7,130,447 B2 * | 10/2006 | Aughey et al. | 382/103 |
| 7,205,960 B2 * | 4/2007 | David | 345/7 |
| 7,526,103 B2 * | 4/2009 | Schofield et al. | 382/104 |
| 7,545,571 B2 * | 6/2009 | Garoutte et al. | 359/630 |
| 7,866,821 B2 * | 1/2011 | Ferguson et al. | 351/221 |
| 2002/0113754 A1 * | 8/2002 | Nakanishi | 345/7 |
| 2003/0063042 A1 * | 4/2003 | Friesem et al. | 345/6 |
| 2004/0085649 A1 * | 5/2004 | Repetto et al. | 359/633 |
| 2005/0141066 A1 | 6/2005 | Ouchi | |
| 2006/0039046 A1 | 2/2006 | Ouchi | |
| 2011/0157667 A1 * | 6/2011 | Lacoste et al. | 359/9 |

FOREIGN PATENT DOCUMENTS

| | | |
|---|---|---|
| JP | 11 142 784 | 7/2003 |
| WO | WO 99/35528 * | 7/1999 |
| WO | WO 2007/029032 | 3/2007 |
| WO | WO 2007/029034 | 3/2007 |
| WO | WO 2007/036550 | 3/2007 |

OTHER PUBLICATIONS

U.K. Patent Office, Search Report, Feb. 15, 2008, from related UK Patent Application No. GB 0720386.2, filed on Oct. 18, 2007.

European Patent Office, Search Report, Feb. 14, 2008, from related European Patent Application No. EP 07270061.0, filed on Oct. 18, 2007.

* cited by examiner

DISPLAY SYSTEMS

RELATED APPLICATION INFORMATION

This application is a United States National Phase patent application of International Patent Application No. PCT/GB2008/050919 which was filed on Oct. 7, 2008, and claims priority to British Patent Application No. 0720386.2, filed on Oct. 18, 2007, and claims priority to European Patent Application No. 07270061.0, filed on Oct. 18, 2007, the disclosures of each of which are incorporated herein by reference.

FIELD OF THE INVENTION

This invention relates to a display system, which is particularly, but not exclusively, suitable for use in head mounted or helmet mounted display apparatus.

BACKGROUND INFORMATION

Hyperstereopsis is a undesirable effect observed when enhanced imagery of a scene is displayed to a user from sensors which are positioned at a stereo separation that is unnatural as perceived by the user. The extent of the hyperstereopsis effect is dictated by the size of the sensors used and the ability to sensibly mount such sensors to a helmet or other suitable retaining apparatus worn by the user. Current solutions for mitigating the hyperstereopsis effect include conventional optical techniques such as those disclosed in U.S. Pat. No. 5,629,807.

U.S. Pat. No. 5,629,807 illustrates a head mounted vision enhancement system that provides improved crash survivability and a better center of gravity. This is accomplished by positioning an objective lens and an intensifier tube of the system closer to a center line of the head of the user and employing an optical arrangement to bring the image back to a correct eye spacing for the user. Hyperstereopsis is thus avoided by folding the intensifier objective lenses from the center of the forehead of the user to the correct interpupil separation for the user. However, such solutions are large and heavy when installed on a helmet worn by the user.

Hyperstereopsis arises in a enhanced imagery system, for example a night vision enhancement system, when the sensors of the systems are located on the side of a helmet at a separation that is larger than the interpupil separation of the user of the system. Hyperstereopsis causes objects to appear distorted and/or closer to the user. Aviators using such systems report that the ground appears to slope upwardly towards the user and appears closer beneath an aircraft than normally expected.

Depth perception is the ability of a user to estimate absolute distances between the user and an object or the relative distances between two objects spaced from the user. The hyperstereopsis effect is a binocular perception and is the result of each eye of the user viewing slightly different images of the same object. The differences in the images occur due to the location of the sensors being different to the interpupil separation between the eyes of a user. This effect distorts the user's perception of slope in depth.

Conventional sensors, for example night vision cameras, are typically large in size and heavy. Therefore, such sensors cannot be mounted at a natural interpupil distance of a user. To do so would introduce too much mass to the front of the helmet worn by the user and could lead to clashes with a helmet visor and associated mechanisms. It will be understood that similar problems arise for head mounted displays as the mass of the sensors will be positioned such as to increase the mass on the front of the head of a user. The mass distribution of such sensors is important when used in an aviation environment wherein the user is subject to a range of gravitational forces and the possibility of a user having to eject from an aircraft whilst the sensors remain in situ relative to the head of the user.

Waveguide type displays are discussed in International publication numbers WO2007/029034 or WO2007/029032. Such waveguide displays offer the benefit of reduced mass and ease of installation in a helmet or head mounted display when compared to conventional optical displays.

SUMMARY OF THE INVENTION

According to a first aspect of the invention, a display system includes a primary waveguide arranged such that a user can view a forward scene through the primary waveguide, an image source arranged to generate an image, and a display optical arrangement arranged to couple the image from the image source into the primary waveguide, wherein an internal surface of the primary waveguide is arranged to internally reflect the image from the image source to a position such that the user can view the image from the image source at the primary waveguide overlaid on the forward looking scene viewable through the primary waveguide, and wherein the primary waveguide is further arranged to reflect light from the forward looking scene to the display optical arrangement which is arranged to transmit the light from the forward looking scene to a sensor device.

In this manner, a sensor device is included in a waveguide type display system and can be positioned such that is reduces the hyperstereopsis effect perceived by a user.

The sensor device may be an image intensifier arranged to enhance light from the forward looking scene and the enhanced light from the image intensifier may feed into the display optical arrangement.

The sensor device may be arranged to determine one or more characteristics of the forward looking scene and to feed information on such characteristics to the display optical arrangement which may be arranged to control the image source to generate an image according to such characteristics.

The image source may be arranged to generate an image in the form of symbology to overlay the forward looking scene.

The primary waveguide may include at least one diffractive element arranged to diffract light from the forward scene to the display optical arrangement. A pair of diffractive elements, each arranged at substantially one end of the primary waveguide, may be arranged to diffract light from the forward scene to the display optical arrangement.

The primary waveguide may include at least one diffractive element arranged to diffract the image from the image source to the user. A pair of diffractive elements, each arranged at substantially one end of the primary waveguide, may be arranged to diffract light from the image source to the user.

A coupling waveguide may be arranged to couple the image generated by the image source into the primary waveguide and to couple light from the forward looking scene into the display optical arrangement. The coupling waveguide may include at least one diffractive element arranged to diffract the image from the image source to the primary waveguide. The coupling waveguide may include at least one diffractive element arrange to diffract light from the forward scene to the display optical arrangement.

The primary waveguide may form part of a visor arranged to be carrier by a helmet.

The display system may be incorporated in a helmet mounted display apparatus.

The sensor device may be a camera.

DETAILED DESCRIPTION

Exemplary embodiments of the present invention will now be described in more detail, by way of example only, with reference to the accompanying drawings.

Figure 1:
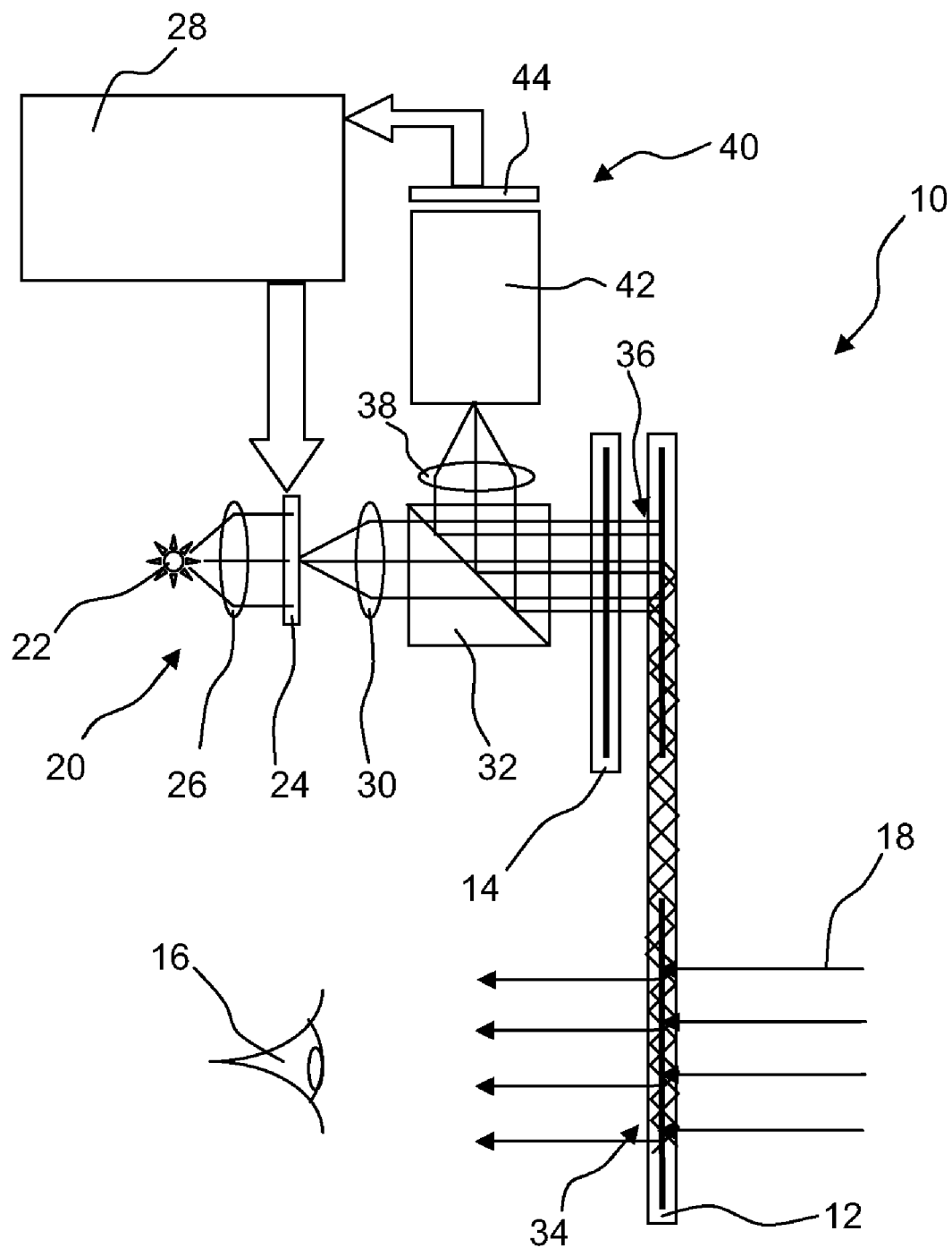
FIG. 1 illustrates a schematic view of the apparatus according to an exemplary embodiment of the present invention.

Referring to FIG. 1, a display system 10 includes a primary waveguide 12 and a coupling waveguide 14 arranged substantially co-planar with one another. The primary waveguide 12 is arranged such that a user 16 can view light from a forward scene 18 through the primary waveguide 12.

An image source 20, including a light source 22 arranged to illuminate a display device 24 via a collection lens 26, is arranged to generate an image to be displayed to the user 16. Collection lens 26 is arranged to focus light from the light source 22 on to the display device 24. The image generated by the image source 20 is dependent on signals generated by an image processor 28 that is used to drive the display device 24. The display device 24 can be a suitable digital display device that is transmissive to light constituting the image to be displayed. Alternatively, the display device 24 could be a reflective device and the light source 22 and collection lens 26 arranged accordingly such that the display device 24 reflects light constituting the image to be displayed.

The display device 24 is illuminated by the light source 22 such that light passing through display device 24 is collimated by collimating optics 30 and thereafter is incident on a beam splitter 32.

Beam splitter 32 is arranged to allow light from the image source 20 to pass therethrough so that it is incident on the coupling waveguide 14. The beam splitter 32 has a suitable optical coating to allow the wavelength of light forming the image to pass. The coupling waveguide 14 is arranged to expand the horizontal axis of the image to be observed by a user 14. The horizontally expanded pupil of collimated display light exits the coupling waveguide 14 and is diffractively coupled into the primary waveguide 12. The primary waveguide 12 is arranged to expand the vertical pupil of the collimated display light. The display light is internally reflected within the primary waveguide 12 to an exit area 34 where the display light, which constitutes a desired image, is diffracted towards the user 16.

It will be understood that the user 16 will observe the image generated by the image source 20 overlaid on light from a forward scene 18 viewable through the primary waveguide 12, such that the image appears at the exit area 34.

Light from the forward looking scene 18 can also be diffracted when it enters the primary waveguide 12 such that it is free to totally internally reflect through the primary waveguide 12 to an exit area 36, where it is diffracted to the coupling waveguide 14 which is arranged to collect the light from a forward scene 18 and to couple this to the beam splitter 32.

The beam splitter 32 is arranged to reflect light from a forward scene 18 through an objective lens 38 which is arranged to focus the light from the forward scene 18 on to an input of a image intensifier tube assembly 42. It will be understood that the beam splitter 32 includes a suitable coating that is highly reflective to the wavelength of light from a forward scene 18.

The image intensifier tube assembly 42 is arranged to enhance light from a forward scene 18 and an output of the image intensifier tube assembly 42 is captured by a charge coupled device 44. An output of the charge coupled device 44 is used as an input to the image processor 28. The image processor 28 is arranged to generate signals to produce required symbology and/or overlays of enhanced light from a forward scene 18 to drive the display device 24. It will be understood that an image generated by the display device 24 is then overlaid on light from a forward scene 18 at exit area 34.

Accordingly, the primary waveguide 12 acts in one direction as a display optical apparatus and in an opposite direction as a sensor imaging optical apparatus. An output from the sensor imaging optical apparatus can then be used as an input to the display optical apparatus. Additional symbology can be generated electronically and overlaid on an image conveyed by the display optical apparatus. As the display and sensor imaging optical apparatus, via, the primary waveguide 12, are located directly in front of the eyes of a user 16, the hyper-stereopsis effect is mitigated. Furthermore, the image intensifier tube assembly 42 can be located to reduce mass on the front of a helmet or head mounted display.

The image that exits that primary waveguide 12 has a large pupil including light from the image source 20, which may contain both symbology and enhanced imagery of light from a forward scene 18, overlaid on light from a forward scene 18 observed by a user 16.

Figure 2:
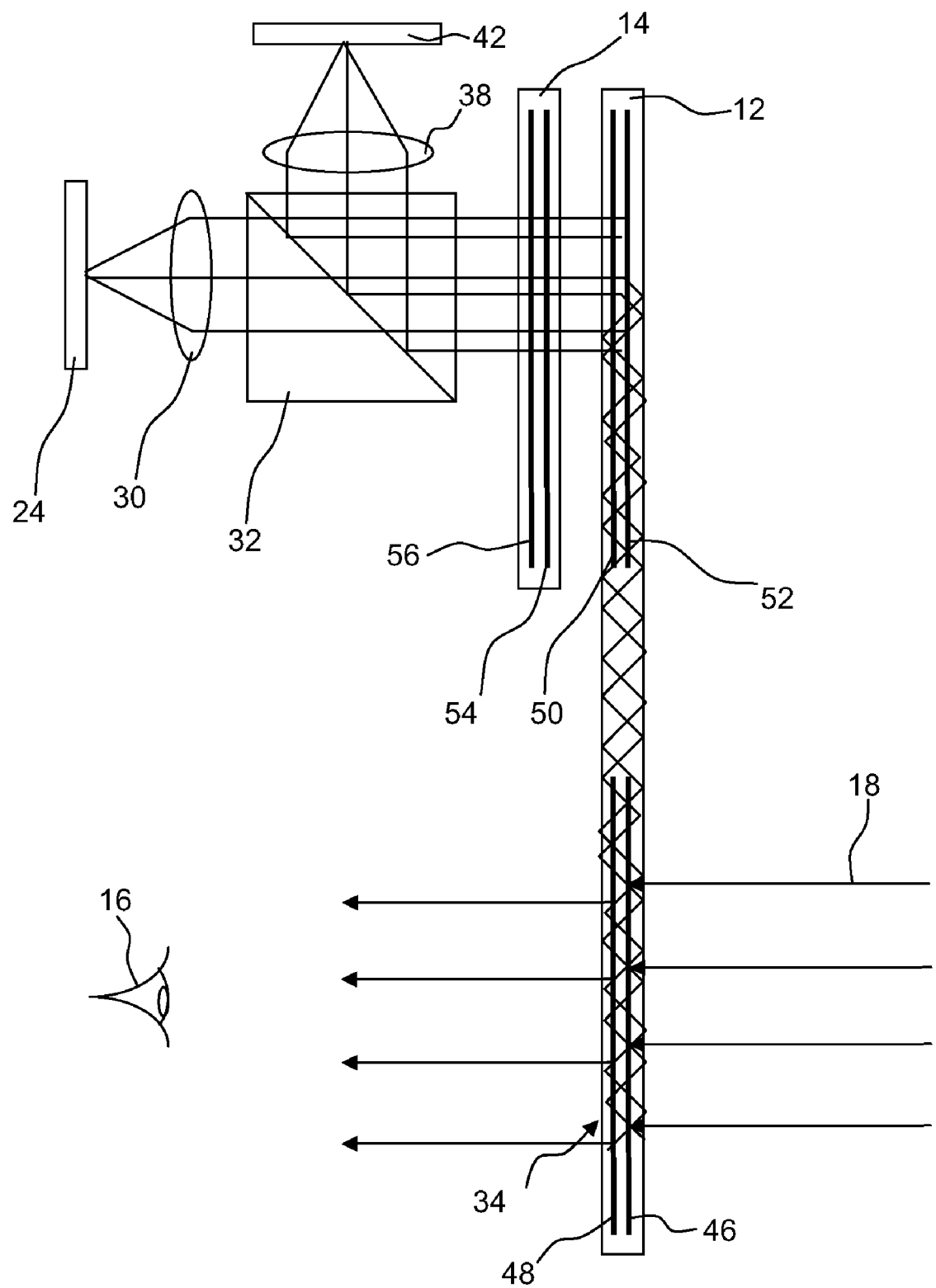
FIG. 2 illustrates a ray trace of the optical pathways throughout an exemplary embodiment of the apparatus of the present invention.

Referring to FIG. 2, wherein like references have been used to indicate similar integers to those described with reference to FIG. 1, the primary waveguide 12 includes therein a first diffractive element 46 and a second diffractive element 48 substantially parallely spaced from the first diffractive element 46. The first and second diffractive elements 46 and 48 are arranged towards one end of the primary waveguide 12 along a line of sight of the user 16 viewing light from the forward scene 18. Furthermore, primary waveguide 12 includes a third diffractive element 50 and a fourth diffractive element 52 arranged substantially parallel to one another and towards an end of the primary waveguide 12 remote from first and second diffractive elements 46 and 48.

First diffractive element 46 is arranged to diffract light from a forward scene 18 to an angle such that it is free to totally internally reflect within the primary waveguide 12 towards fourth diffractive element 52. Fourth diffractive element 52 is arranged to diffract light from a forward scene 18 towards the beam splitter 32 via the coupling waveguide 14. The light from a forward scene 18 is then reflected by beam splitter 32 through objective lens 38 to be focussed onto the image intensifier tube assembly 42.

Light passing through the display device 24 is collimated by collimating optics 30 and passes through beam splitter 32 to primary waveguide 12 via coupling waveguide 14. The third diffraction element 50 within primary waveguide 12 is arranged to diffract light from the display device 24 such that it totally internally reflects within the primary waveguide 12 and the third diffractive element is also arranged to expand the vertical pupil of the light from the display device 24. Second diffractive 48 is arranged to diffract light originating from the display device 24 at exit area 34 such that it exits the primary waveguide 12 is directed towards the user 16.

The coupling waveguide 14 includes therein a fifth diffractive element 54 arranged to couple light from a forward scene 18 into the beam splitter 32 and a sixth diffractive element 56 arranged to horizontally expand the pupil of light originating from the display device 24 before it is diffractively inputted into primary waveguide 12.

Light from the display device 24 exits the primary waveguide 12 as a large pupil collimated display that contains symbology and/or enhanced imagery of the light from a forward scene 18. In this manner, the combined imagery is presented to the eye of the user 16 using the same optical path for both sensor device and image source.

As the sensor device 40 operates at a different wavelength to the visual spectrum used in the display device 24, separate diffractive elements can be used to couple light from a forward scene 18 to the sensor device 40. This is also advantageous as the first and fourth diffractive elements 46, 52 are optimized to be low enough in efficiency so as to provide a uniform pupil luminance at an eye of the user 16 and to provide a good view for the user of light from a forward scene 18. The first and fourth diffractive elements 46, 52 associated with the sensor device 40 can be made as efficient as possible in order to maximize capture of light from a forward scene 18. As the first and fourth diffractive elements 46, 52 will only be efficient at non-visual wavelengths they will have little detrimental effect on a display generated by the display device reaching the eye of a user 16. Second and third diffractive elements 48, 50 are optimized to operate at wavelengths of the visual spectrum of user 16.

The invention claimed is:

1. A display system, comprising:
   a primary waveguide configured so that a user can view a forward scene through the primary waveguide;
   an image source configured to generate an image; and
   a display optical arrangement configured to couple the image from the image source into the primary waveguide;
   wherein an internal surface of the primary waveguide is configured to internally reflect the image from the image source to a position such that the user can view the image from the image source at the primary waveguide overlaid on the forward scene viewable through the primary waveguide, and
   wherein the primary waveguide is configured to reflect light from the forward scene to the display optical arrangement, which is configured to transmit the light from the forward scene to a sensor device.

2. The display system according to claim 1, wherein the sensor device includes an image intensifier configured to enhance light from the forward scene and the enhanced light from the image intensifier is feed into the display optical arrangement.

3. The display system according to claim 1, wherein the sensor device is configured to determine one or more characteristics of the forward scene, and to feed information on such characteristics to the display optical arrangement, which is configured to control the image source to generate an image according to such characteristics.

4. The display system according to claim 2, wherein the sensor device is configured to determine one or more characteristics of the forward scene, and to feed information on such characteristics to the display optical arrangement, which is configured to control the image source to generate an image according to such characteristics.

5. The display system according to claim 1, wherein the image source is configured to generate an image in the form of symbology to overlay the forward scene.

6. The display system according to claim 1, wherein the primary waveguide includes at least one diffractive element configured to diffract light from the forward scene to the display optical arrangement.

7. The display system according to claim 6, wherein a pair of diffractive elements, each arranged at substantially one end of the primary waveguide, are configured to diffract light from the forward scene to the display optical arrangement.

8. The display system according to claim 1, wherein the primary waveguide includes at least one diffractive element configured to diffract the image from the image source to the user.

9. The display system according to claim 8, wherein a pair of diffractive elements, each arranged at substantially one end of the primary waveguide, are configured to diffract light from the image source to the user.

10. The display system according to claim 1, wherein a coupling waveguide is configured to couple the image generated by the image source into the primary waveguide, and to couple light from the forward scene into the display optical arrangement.

11. The display system according to claim 10, wherein the coupling waveguide includes at least one diffractive element configured to diffract the image from the image source to the primary waveguide.

12. The display system according to claim 10, wherein the coupling waveguide includes at least one diffractive element configured to diffract light from the forward scene to the display optical arrangement.

13. The display system according to claim 11, wherein the coupling waveguide includes at least one diffractive element configured to diffract light from the forward scene to the display optical arrangement.

14. The display system according to claim 1, wherein the primary waveguide forms part of a visor configured to be carried by a helmet.

15. The display system according to claim 1, wherein the display system is incorporated in a helmet mounted display apparatus.

16. The display system according to claim 1, wherein the sensor device includes a camera.

* * * * *